US008509450B2

(12) United States Patent
Sun

(10) Patent No.: US 8,509,450 B2
(45) Date of Patent: Aug. 13, 2013

(54) DYNAMIC AUDIBILITY ENHANCEMENT

(75) Inventor: Xuejing Sun, Rochester Hills, MI (US)

(73) Assignee: Cambridge Silicon Radio Limited, Cambridge (GB)

( * ) Notice: Subject to any disclaimer, the term of this patent is extended or adjusted under 35 U.S.C. 154(b) by 323 days.

(21) Appl. No.: 12/861,361

(22) Filed: Aug. 23, 2010

(65) Prior Publication Data

US 2012/0045069 A1 Feb. 23, 2012

(51) Int. Cl.
*H04B 3/20* (2006.01)

(52) U.S. Cl.
USPC ................... 381/66; 381/83; 381/96; 381/95; 381/71.1; 381/317; 381/321; 381/94.2; 381/94.3; 381/94.4; 379/68; 379/78; 379/406.01; 379/406.02; 379/406.03; 700/94

(58) Field of Classification Search
USPC ................ 381/66, 71.1, 95, 96, 83, 317, 321, 381/94.1-94.7; 379/68, 78, 406.01-406.09; 704/E19.001; 700/94
See application file for complete search history.

(56) References Cited

U.S. PATENT DOCUMENTS

| | | | | |
|---|---|---|---|---|
| 4,783,819 | A * | 11/1988 | De Koning et al. | 381/83 |
| 5,699,479 | A * | 12/1997 | Allen et al. | 704/205 |
| 5,951,626 | A * | 9/1999 | Duttweiler | 708/322 |
| 6,529,605 | B1 | 3/2003 | Christoph | |
| 6,999,920 | B1 * | 2/2006 | Matt et al. | 704/215 |
| 7,426,270 | B2 | 9/2008 | Alves et al. | |
| 7,430,506 | B2 * | 9/2008 | Nam et al. | 704/207 |
| 8,160,261 | B2 * | 4/2012 | Schulein et al. | 381/56 |
| 8,189,766 | B1 * | 5/2012 | Klein | 379/406.07 |
| 2003/0235244 | A1 * | 12/2003 | Pessoa et al. | 375/232 |
| 2005/0114127 | A1 * | 5/2005 | Rankovic | 704/233 |
| 2007/0055508 | A1 * | 3/2007 | Zhao et al. | 704/226 |

(Continued)

FOREIGN PATENT DOCUMENTS

WO WO 2010/092523 A1 * 8/2010

OTHER PUBLICATIONS

Johnston, Transform Coding of Audio Signals Using Perceptual Noise criteria, IEEE,1988.*

(Continued)

*Primary Examiner* — Mohammad Islam
*Assistant Examiner* — Kuassi Ganmavo
(74) *Attorney, Agent, or Firm* — Frommer Lawrence & Haug LLP; John W. Branch

(57) ABSTRACT

A method of enhancing an audio signal includes the steps of: a) receiving a primary audio input signal, b) receiving a detected audio signal which comprises: A) an echo component derived from play-out of the primary audio input signal and B) a noise component, and c) estimating from the primary audio input signal and the detected audio signal: 1) a set of frequency-specific lower bound gains, such that each frequency-specific lower bound gain, when applied to a respective frequency of the primary audio input signal, would cause the noise component to just mask the echo component at that respective frequency and 2) a set of frequency-specific upper bound gains, such that each frequency-specific upper bound gain, when applied to a respective frequency of the primary audio input signal, would cause the echo component to just mask the noise component at that respective frequency; d) estimating a set of frequency-specific gains in such a way that each frequency-specific gain falls between the respective frequency-specific lower bound gain and respective frequency-specific upper bound gain; and e) applying the frequency-specific gains to the primary audio input signal.

20 Claims, 8 Drawing Sheets

(56) References Cited

U.S. PATENT DOCUMENTS

| | | | | |
|---|---|---|---|---|
| 2009/0225980 | A1* | 9/2009 | Schmidt et al. | 379/406.02 |
| 2009/0238373 | A1* | 9/2009 | Klein | 381/66 |
| 2009/0254340 | A1 | 10/2009 | Sun et al. | |

OTHER PUBLICATIONS

Benesty et al., "A New Class of Doubletalk Detectors Based on Cross-Correlation," IEEE Transactions on Speech and Audio Processing, Mar. 2000, pp. 168-172, vol. 8, No. 2.

Guelou et al., "Analysis of Two Structures for Combined Acoustic Echo Cancellation and Noise Reduction," Proc. Acoustics, Speech, and Signal Processing, IEEE International Conference, May 1996, pp. 637-640, vol. 2.

Goldin et al., "Automatic Volume and Equalization Control in Mobile Devices," Audio Engineering Society Convention Paper 6960, Oct. 2006, pp. 1-6, 121st Convention, San Francisco, CA.

Tzur et al., "Sound Equalization in a Noisy Environment," Audio Engineering Society Convention Paper, May 2001, pp. 1-6, 110th Convention, Amsterdam, The Netherlands.

Johnston, "Transform Coding of Audio Signals Using Perceptual Noise Criteria," IEEE Journal on Selected Areas in Communications, Feb. 1988, pp. 314-323 , vol. 6, No. 2.

* cited by examiner

DYNAMIC AUDIBILITY ENHANCEMENT

BACKGROUND OF THE INVENTION

The present invention relates generally to noise reduction in perceived audio signals. A well understood problem in the field of audio playback systems is the time variation of noise level and spectral characteristics. When listening to an audio signal in a noisy environment such as a busy public place, outdoors on a windy day, or in a moving vehicle, the noise level can change frequently, for example with the passing of traffic or groups of people in conversation. It is inconvenient for the user to have to manually change the volume of the audio playback as these changes occur to achieve acceptable levels of audibility and intelligibility.

One method of addressing this problem is to measure the noise level with a microphone and automatically increase the volume when the noise level increases and decrease the volume when the noise level decreases.

However, noise is rarely perfectly described by a white noise model, spread uniformly across the frequency spectrum. In a moving car the ambient noise is largely at low frequencies so a uniform volume increase will make the audio seem higher pitched than it should as the noise masks the low frequency components of the audio signal. The spectrum of the noise can, like the noise level, change frequently; again using the example of a motor vehicle many variables are involved including speed, road surface and passing traffic.

Therefore it is preferable to continuously monitor both the noise level and its frequency characteristics and apply dynamic frequency-specific gains to the audio signal with the aim of ensuring it is audible and intelligible over the noise. The output of such a dynamic audibility enhancement system should be a version of the primary audio input signal, processed in such a way as to improve the listening experience for a typical listener in a given noise environment.

FIG. 1 depicts a dynamic frequency-specific audibility enhancement system at one moment in time. The user 1 is trying to listen to primary audio signal input x(n) from audio source 2. This could for example be a telephone conversation using a hands-free kit or a car radio playing music. However the audio is partially masked by noise from noise source 3. The system employs microphone 4 to measure the sound pressure levels near the user's head. The signal measured by microphone 4, d(n), is input to signal processor 5. Signal processor 5 calculates frequency-specific gain profile G(n). Primary audio signal input x(n) is multiplied with frequency-specific gain G(n) to produce a noise compensated signal. This noise compensated signal is then played through loudspeaker 6.

In an ideal system, the frequency-specific gain could be $$G(n) = \frac{|d(n)|}{|x(n)|} \qquad (1)$$

However the sound the user hears depends on the variation in sound pressure levels at the listener's ear, not the signals inside the signal processor; these are not equivalent in a real world system. Therefore G(n) should be compensated by an equalisation factor. The value of the equalisation factor may depend on many variables. These could include analogue gains within the system, the loudspeaker and microphone frequency responses and the distances between the users ear, microphone, loudspeaker and noise source. This equalisation factor may be determined by calibration of each individual system, as is the case in, for example, Sergey. Kib; Budkin, Alexey; Goldin, Alexander A. "Automatic Volume and Equalization Control in Mobile Devices", *Proc. of* 121 *AES Convention,* 2006. However calibration procedures are cumbersome, time and power consuming, must be updated frequently to remain accurate due to changes in the relevant distances and are not always feasible in practice.

In U.S. Pat. No. 6,529,605 the calibration problem is avoided. The signal picked up by the microphone is split into a desired signal and a noise signal by an adaptive filter. The desired signal is extracted and utilised to form a control signal which is subsequently used to control the loudspeaker signal. However, the problem remains that this system does not consider that the user may be speaking: an important consideration especially for implementations in hands-free kits and mobile telephones. Therefore the loudspeaker signal will be amplified whenever the user speaks, drowning them out. This effect will be intensely irritating to the user and make it very difficult for them to continue a conversation with the device switched on. In implementations such as headphones for listening to music from a personal audio device or car radio this will reduce user enjoyment and in telephone related applications this will defeat the object of the device entirely.

Another problem with audio playback systems, in particular in confined spaces such as vehicles, is the interference of the currently playing sound from the loudspeaker with echoes of the recently played sound from the loudspeaker. To cancel the echo signal an adaptive filter can be used which identifies the acoustic echo path so that future echoes may be calculated and subtracted from the loudspeaker signal. However when user speech is present at the same time as a loudspeaker signal the adaptive filter can diverge. Thus a double talk detector can be used to slow down or halt adaptation of the filter in the presence of user speech.

Finally, most dynamic audibility enhancement systems simply raise the magnitude of the loudspeaker signal such that the magnitude of the signal reaching the user's ear is above that of the noise signal. This does not fully take into account auditory masking effects such as those of tone-like noise signals, e.g. the distinct narrow frequency peaks, or formants, commonly found in speech and music. In quiet conditions the absolute threshold of hearing for a normal human ear lays along curve A, shown in FIG. 2. Thus in quiet conditions signal D would be audible. However, when tone C is present the threshold of hearing at frequencies surrounding the tone is altered, gaining a "hump" around the frequency of the tone as shown by curve B. This masks signals not only at the frequency of the tone but also at nearby frequencies. In this case signal D becomes inaudible in the presence of tone C. In order to make D audible, it is necessary to raise the level of D above the level of the altered threshold of hearing B evaluated at the frequency of signal D. Note that, as shown in FIG. 2, it is possible for the maximum in the altered threshold of hearing B to be at a lower sound pressure level than the level of tone C, thus it is not always necessary for audibility of the play-out signal to raise the level of the loudspeaker signal such that the level of the echo signal is higher than the level of the noise.

In M. Tzur (Zibulski) and A. A. Goldin, "Sound equalization in a noisy environment", *Proc. Of* 110 *AES Convention,* 2001, the auditory masking threshold profile of the loudspeaker signal is estimated and the final gain profile is determined empirically based on this threshold profile such that the loudspeaker signal always masks the noise. However total noise masking is not always desirable. For example when listening to music in a car: while it is necessary that the music is not masked completely by the noise in order to enjoy the music, it is unsafe to have all traffic noise masked by the music, the driver should be able to hear and react to noises such as the sound of a motorbike overtaking or an approaching emergency service vehicle siren.

Another psychoacoustic effect that basic systems fail to take into account is the human ear's varying sensitivity to different frequencies. FIG. 3 shows equal loudness contours as perceived by a normal human, demonstrating that the ear becomes relatively more sensitive to low frequencies at high intensities. Therefore tonal balance should be considered.

What is needed is a dynamic frequency dependent audibility enhancement system with no calibration or divergence of adaptive filter algorithms due to user speech, which takes into account psychoacoustic effects so that a user is able to hear an audio signal as intended without all environmental noise being totally drowned out.

SUMMARY OF THE INVENTION

According to a first aspect of the invention, there is provided a method of enhancing an audio signal comprising the steps of: a) receiving a primary audio input signal, b) receiving a detected audio signal which comprises: A) an echo component derived from play-out of the primary audio input signal and B) a noise component, and c) estimating from the primary audio input signal and the detected audio signal: 1) a set of frequency-specific lower bound gains, such that each frequency-specific lower bound gain, when applied to a respective frequency of the primary audio input signal, would cause the noise component to just mask the echo component at that respective frequency and 2) a set of frequency-specific upper bound gains, such that each frequency-specific upper bound gain, when applied to a respective frequency of the primary audio input signal, would cause the echo component to just mask the noise component at that respective frequency; d) estimating a set of frequency-specific gains in such a way that each frequency-specific gain falls between the respective frequency-specific lower bound gain and respective frequency-specific upper bound gain; and e) applying the frequency-specific gains to the primary audio input signal.

Each frequency-specific gain may be specific to a respective frequency sub-band.

The step of applying the frequency-specific gains to the primary audio input signal may produce an output signal, and the method may comprise the further step of: f) playing out the output signal.

Step c) may comprise the sub-steps of: c-i) estimating the echo component, c-ii) estimating the noise component, c-iii) estimating a frequency-specific auditory masking threshold for the echo component, c-iv) estimating a frequency-specific auditory masking threshold for the noise component, and c-v) using the aforesaid frequency-specific auditory masking thresholds to calculate the upper and lower bounds.

The frequency-specific gains may each be equal to the result of summing two terms; the first term being equal to the result of multiplying a weighting factor, having a value between zero and one, with the respective frequency-specific upper bound, and the second term being equal to the result of multiplying one minus the weighting factor with the respective frequency-specific lower bound.

The frequency-specific gains may each be equal to the result of summing two terms; the first term being equal to the result of multiplying a weighting factor, having a value between zero and one, with the respective frequency-specific upper bound, and the second term being equal to the result of multiplying one minus the weighting factor with the respective frequency-specific lower bound, the method may comprise the further step of the weighting factor being specified by a user.

Step c) may comprise the sub-step of: c-i) estimating the echo component and sub-step c-i) may be done by means of an adaptive filter algorithm.

Step c) may comprise the sub-step of: c-i) estimating the echo component and sub-step c-i) may be done by means of an adaptive filter algorithm, wherein the detected audio signal may be monitored for the presence of user speech, and the adaptation of the filter may be slowed down or halted when user speech is detected.

The execution of step e) may produce an output signal, the method may comprise the further step of: f) playing out the output signal produced in step e), step e) may comprise the sub-steps of: e-i) applying the frequency-specific gains to the primary audio input signal, this sub-step producing a gain-adjusted signal, and e-ii) modifying the gain-adjusted signal produced in sub-step e-i) such that the varying sensitivity to different frequencies at different sound pressure levels of the average human ear is compensated for.

According to a second aspect of the invention, there is provided a system for enhancing an audio signal comprising: a primary audio input for receiving a primary audio input signal, a detected audio input for receiving a detected audio signal wherein the detected audio signal comprises: A) an echo component derived from play-out of the primary audio input signal and B) a noise component, and an estimation unit for estimating from the primary audio input signal and the detected audio signal: 1) a set of frequency-specific lower bounds for gains, such that each frequency-specific lower bound gain value, when applied to a respective frequency of the primary audio input signal, would cause the noise component to just mask the echo component at that respective frequency and 2) a set of frequency-specific upper bounds for gains, such that each frequency-specific upper bound gain, when applied to a respective frequency of the primary audio input signal, would cause the echo component to just mask the noise component at that respective frequency; 3) a set of frequency-specific gains estimated in such a way that each frequency-specific gain falls between the respective frequency-specific lower bound and respective frequency-specific upper bound; and a processing unit for applying the frequency-specific gains to the primary audio input signal.

The system may further comprise: a loudspeaker for playing out the signal produced by the processing unit.

The estimation unit may comprise: an echo estimation module for estimating the echo component, a noise estimation module for estimating the noise component, a module for estimating a frequency-specific auditory masking threshold for the echo component, a module for estimating a frequency-specific auditory masking threshold for the noise component, and a module for using the aforesaid frequency-specific auditory masking thresholds to estimate the frequency-specific upper and lower bounds.

The frequency-specific gains may be equal to the result of summing two terms; the first term being equal to the result of multiplying a weighting factor, having a value between zero and one, with the respective frequency-specific upper bound, and the second term being equal to the result of multiplying one minus the weighting factor with the respective frequency-specific lower bound, the system further comprising a control for adjusting the weighting factor, actuable by the user.

The estimation unit may comprise: an echo estimation unit which estimates the echo component using an adaptive filter.

The estimation unit may comprise: an echo estimation unit configured to estimate the echo component using an adaptive filter, the system further comprising: a double talk detector configured to monitor the detected audio input signal for the presence of user speech, and slow down or halt the adaptation of the filter when user speech is detected.

The system may further comprise: a processing unit for applying the frequency-specific gains to the primary audio input signal, and a tonal balance compensation module for modifying the signal produced by the processing unit such that the varying sensitivity to different frequencies at different sound pressure levels of the average human ear is compensated for.

The estimation unit may comprise: an echo estimation module which estimates echo using an adaptive filter, wherein the adaptive filter is a normalized least mean squares filter.

The system may further comprise: a noise estimation module, wherein the noise estimation module is a recursive noise estimator configured to be adaptively controlled by the output of a module which is configured to estimate the probability of the absence of speech in the detected audio signal.

BRIEF DESCRIPTION OF THE DRAWINGS

Aspects of the present invention will now be described by way of example with reference to the accompanying drawings. In the drawings.

DETAILED DESCRIPTION OF THE INVENTION

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Adaptive filtering is provided to separate noise from a desired signal. Thus no calibration is needed, and an acoustic echo path may also be calculated. A double talk detector is provided. This can prevent divergence of the adaptive filter. A noise estimation unit is provided to estimate the noise signal. A dynamic gain calculation module is provided. This can calculate auditory masking thresholds for both echo and noise. It can also apply frequency dependent gains. For example these gains may have a lower bound at which the loudspeaker signal is just audible over the noise. They could have an upper bound at which the loudspeaker signal just causes the noise to become inaudible. If the gains are kept within these limits then both the loudspeaker signal and the environment can be expected always to be audible.

In example apparatus, a microphone monitors the sound environment of the user of, for example, a hands-free kit for a mobile telephone. The microphone signal is passed to a double talk detector and an adaptive filter to separate it into ambient noise, user speech, and the echo of the loudspeaker signal. It is then processed by a noise estimation module and a dynamic gain calculation unit determines the frequency-specific gains to apply to the loudspeaker signal so that, in an ideal implementation, the user hears the echo of the loudspeaker signal as they would hear the primary audio input signal in the absence of all other sounds and distorting effects.

Figure 5:
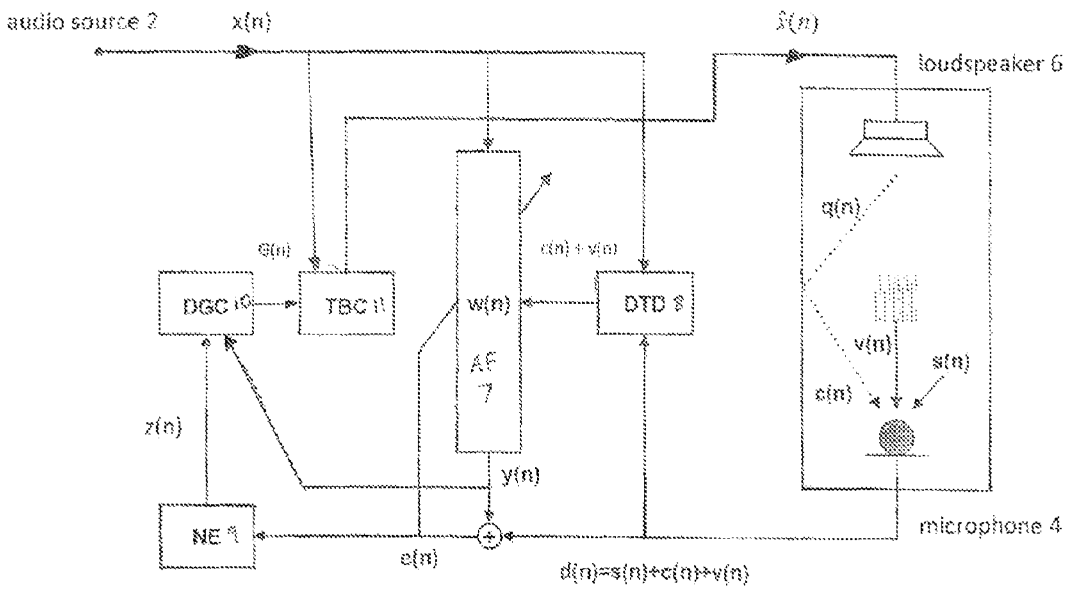
FIG. 5 shows an example system.

The example system shown in FIG. 5 may be implemented in a hands-free system for using a mobile telephone in a car. The primary audio input signal x(n), in this case the speech signal of the person the user is conversing with, is received by the system at audio source 2. A modified version of the primary audio input signal, $\hat{x}(n)$, is played out through the loudspeaker 6. This signal is propagated by the interior of the automobile through the acoustic path q(n), for example by reflection off the interior surfaces of the vehicle. This generates the echo signal c(n). The ambient noise at the microphone is v(n). The sound pressure level at the microphone is the sum of the ambient noise signal v(n), the echo signal c(n), and the user's own speech signal, s(n).

Assuming the ambient noise either a) comes from a source relatively distant from the user's ear and the microphone compared to the distance between the user's ear and the microphone, or b) is well diffused, and further assuming that the microphone is omnidirectional, the ambient noise signal heard by the user may be treated as approximately equal to the ambient noise signal picked up by the microphone. For an implementation in a car hands-free kit these assumptions will generally be true since the ambient noise will largely come from vibrations of the car body, and thus be both diffused and originate from distances of the order of one meter from the user's ear, whereas the microphone will be of the order of one centimeter from the user's ear, and the microphones used are typically omnidirectional. In addition, assuming the distance between the microphone and the user's ear is significantly smaller than the distance between the loudspeaker and the user's ear, the loudspeaker signal (and echo) received at the microphone may be treated as approximately equal to that received at the user's ear. Again, this assumption typically holds in a hands-free kit, where the speaker is commonly attached to the car dashboard and the microphone to a sun visor, a headset worn by the user or an analogous device. Therefore, in most practical situations it is appropriate to assume that the energy ratio of echo to ambient noise in the microphone signal approximates to that at the user's ear. Thus the gain profile to be applied in order to cancel the noise effects is $$G(n) = \max\left(1, \frac{|v(n)|}{|c(n)|}\right) \quad (2)$$

That is, at the frequencies where the echo signal exceeds the noise signal, no gain is applied, but at the frequencies where the noise signal exceeds the echo signal, the gain applied is the ratio of the amplitudes of the noise and echo signals, each at those respective frequencies.

The loudspeaker signal is then amplified according to the gain factor, making the amplified loudspeaker signal $\hat{x}(n)$ equal to the primary audio input signal multiplied by the gain factor:

$$\hat{x}(n) = x(n) \cdot G(n) \quad (3)$$

In order to calculate equation (2), noise signal v(n), echo signal c(n), and the user's own speech signal, s(n) are separated.

To calculate the echo signal c(n), the primary audio input signal x(n) and the microphone signal d(n) may be compared using an adaptive filter w(n), labelled 7 in FIG. 5. (The signals actually compared are the primary audio input signal x(n) and the output of a double talk detector 8, for reasons which will be explained later.) The objective is to identify the acoustic echo path q(n) using the adaptive filter w(n), and then subtract the resultant signal y(n) from the microphone signal d(n). In the ideal case w(n)=q(n) so that y(n)=c(n) and the resultant error signal e(n) is an echo free signal.

Adaptive filter 7 may be a sub-band based normalised least mean squares adaptive filter. This updates its filter function w(n) every frame (with frames indexed by l) using the previous frame's filter function, the primary audio input signal, and the previous frame's error signal. The filter function is frequency-specific, that is it defines a series of values, each value being in respect of a respective frequency sub-band (with sub-bands indexed by k). To achieve this, the frequency-specific filter function may be calculated independently for each sub-band. The frequency-specific filter function may, for example, be defined by a function that takes as an input a value representing frequency or the index of a sub-band; or by a matrix having a series of values, one for each sub-band. In one example, the output of the filter for the frequency sub-band k at the $l^{th}$ frame, Y*(l), is formed by multiplying the transpose of the primary audio input signal for the frequency sub-band k at the $l^{th}$ frame, $X_k^T(l)$, with the filter function for the frequency sub-band k at the $l^{th}$ frame, $W_k(l)$:

$$Y_k(l)=X_k^T(l)W_k(l) \quad (4)$$

An update formula for the filter in the frequency domain could be:

$$W_k(l+1)=W_k(l)+\mu_k(l)[X_k^*(l)E_k(l)] \quad (5)$$

That is, the filter function for the frequency sub-band k at the $(l+1)^{th}$ frame, $W_k(l+1)$, is given by the filter function for the frequency sub-band k at the $l^{th}$ frame, $W_k(l)$, plus the step size for the frequency sub-band k at the $l^{th}$ frame, $\mu_k(l)$, multiplied by the product of the conjugate value of the primary audio input signal for the frequency sub-band k at the $l^{th}$ frame, $X_k^*(l)$, and the error signal for the frequency sub-band k at the $l^{th}$ frame, $E_k(l)$.

The error signal is the microphone signal after subtracting the estimated echo signal and is given by $$E_k(l)=D_k(l)-Y_k(l) \quad (6)$$

That is, the error signal for the frequency sub-band k at the $l^{th}$ frame, $E_k(l)$, is equal to the microphone signal for the frequency sub-band k at the $l^{th}$ frame minus the output of the adaptive filter for the frequency sub-band k at the $l^{th}$ frame, $Y_k(l)$.

The step size for the frequency sub-band k at the $l_{th}$ frame is given by $$\mu_k(l)=\frac{\mu}{\hat{\sigma}^2_{X,k}(l)} \quad (7)$$

That is, the step size $\mu_k(l)$ is found by dividing a constant real value μ by $\hat{\sigma}^2_{X,k}(l)$, the power estimate of the primary audio input signal. The constant μ is the adaptation rate (or learning rate), which controls the trade-off between convergence speed and divergence in the presence of interference. A larger value of μ causes the least mean squares algorithm to achieve faster convergence. In practice μ can be empirically determined to yield acceptable performance in a particular implementation.

$\hat{\sigma}_{X,k}(l)$ can be estimated recursively as below:

$$\hat{\sigma}^2_{X,k}(l)=\beta\hat{\sigma}^2_{X,k}(l-1)+(1-\beta)|X_k(l)|^2 \quad (8)$$

for 0<β<1. That is, the power estimate of the primary audio input signal for the frequency sub-band k at the $l^{th}$ frame is calculated by multiplying a value β between 0 and 1 with the power estimate of the primary audio input signal for the frequency sub-band k at the $(l-1)^{th}$ frame and adding the product of (1−β) and the modulus squared of the primary audio input signal for the frequency sub-band k at the $l^{th}$ frame, $X_k(l)$. β is a time constant between 0 and 1 that decides the weight of each frame, and hence the effective average time. Equation 8 corresponds to a first order low pass infinite impulse response filter that smoothes out the unwanted fluctuations $$H(z)=\frac{1-\beta}{1-\beta z^{-1}} \quad (9)$$

A necessary condition for this system to be both stable and causal is that |β|<1. Since for the low-pass filter case 0<β<1, it is convenient to define $\beta=e^{-b}$ where b>0. Thus, β can be derived as:

$$\beta=\exp(-1/(TF_s/L)) \quad (10)$$

where T is a time constant, $F_s$ is the sampling rate, and L is the decimation factor or frame rate in samples. Typical values could be, for example, T=0.2 seconds; $F_s$=8 kHz; and L=64 samples.

The reason for processing the microphone signal with a double talk detector before inputting it to the adaptive filter will now be explained in relation to an example system implemented in a mobile telephone hands-free kit. When both participants in the conversation are talking simultaneously, commonly known as double talk in the literature, the microphone signal d(n) will contain ambient noise signal v(n), echo c(n), and near-end speech signal s(n). A double talk detector 8 is included to prevent the adaptive filter algorithms from diverging and failing to estimate the acoustic path correctly. For example, a simple state machine can be designed using voice activity detectors on the send and receive sides of the communication channel. By identifying the condition where only the receive (loudspeaker) signal is present the adaptive filter can be halted in all other cases.

Therefore in the ideal situation in which the double talk detector 8 functions perfectly to detect the user's speech signal s(n) in the microphone signal, and the adaptive filter 7 functions perfectly to subtract the echo signal c(n) from the double talk detector output, the error signal e(n) is equal to the primary audio input signal x(n) plus the ambient noise signal v(n). Thus the ambient noise signal v(n) may be found by processing the error signal e(n) with a noise estimation module 9. This could, for example, use the robust noise estimation algorithm set out in the assignee's previous U.S. patent application Ser. No. 12/098,570, incorporated herein by reference in its entirety.

Once the echo and noise estimate have been obtained in each sub-band, a frequency-specific gain can be derived for sub-band k and frame/as:

$$G_k(l)=\max\left(1,\ \frac{\sqrt{P_k(l)}}{|Y_k(l)|}\right) \tag{11}$$

That is, the gain factor to be applied to frame l in frequency sub-band k is the greater of one, and the quotient of the square root of the ambient noise power for the frequency sub-band k at the $l^{th}$ frame, $P_k(l)$, and the modulus of the estimated echo signal for the frequency sub-band k at the $l^{th}$ frame, $Y_k(l)$.

Figure 1:
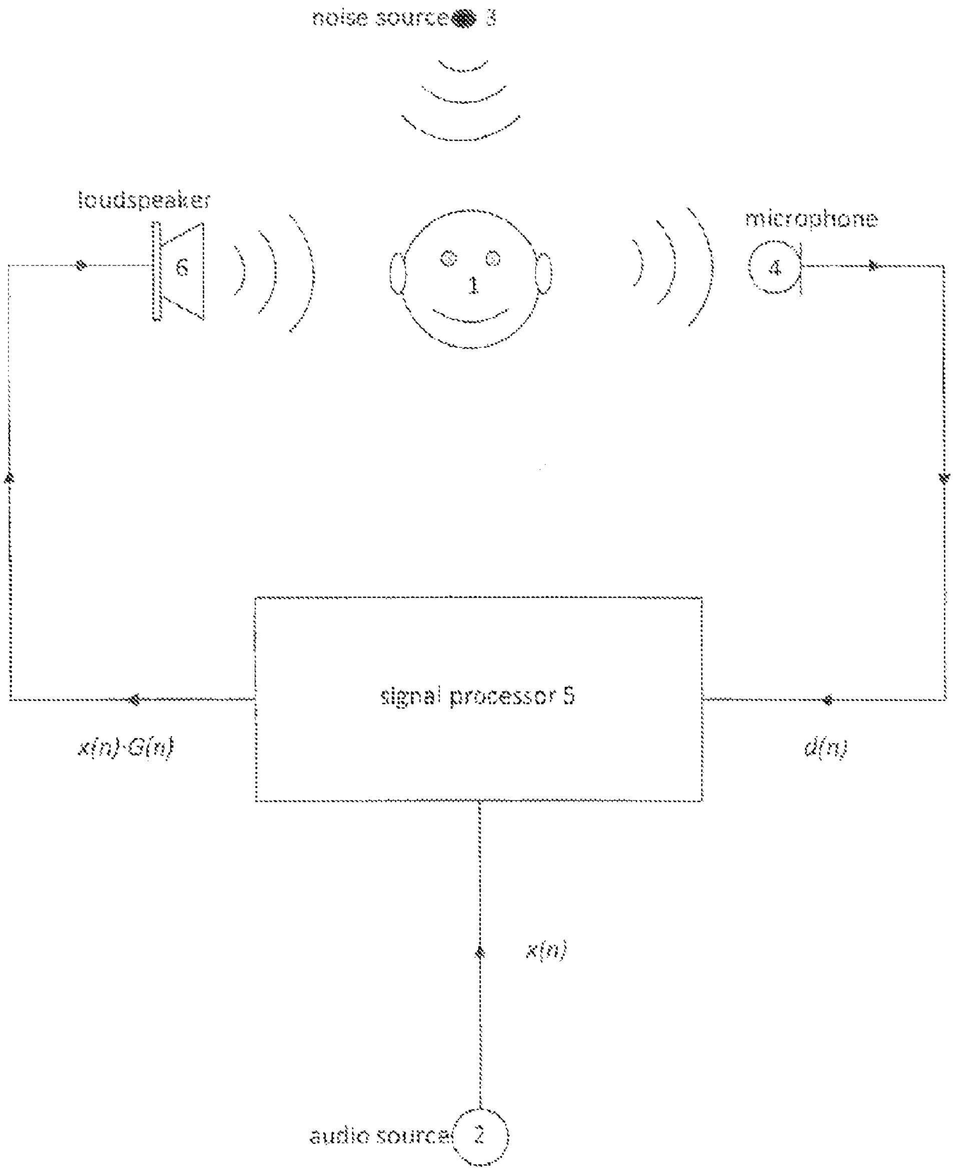
FIG. 1 shows a schematic of the structure of a dynamic frequency dependent audibility enhancement system.
Figure 2:
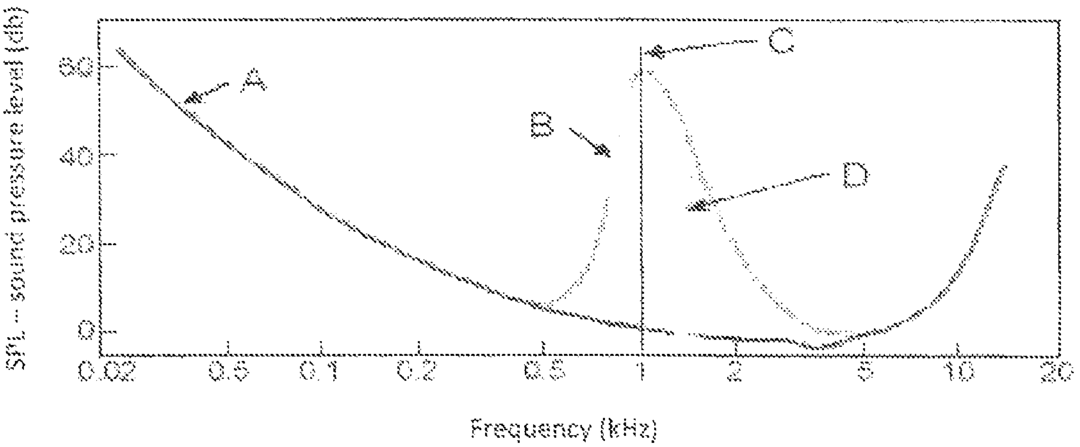
FIG. 2 shows an example of auditory masking.

The implicit assumption of the above gain calculation is that in order to hear the loudspeaker signal the magnitude of the echo signal has to be greater than that of the noise signal. However due to the auditory masking effect illustrated in FIG. 2 this assumption is not always accurate; in order to make D audible, its sound pressure level only needs to be raised above the level of curve B.

The masking threshold may be calculated with the procedure used in the standard MP3 codec, as described in Johnston, J. D., "Transform coding of audio signals using perceptual noise criteria," IEEE Journal Selected Areas in Communications, Vol. 6, No. 2, February 1988, pp. 314-323. Separate auditory masking threshold profiles are calculated for the estimated echo signal Y) and the noise signal $P_k(l)$, respectively. For each short signal frame, the main steps are:

1. A critical band analysis is performed by partitioning the linear spectrum into critical bands on a bark scale. The energy for each critical band is computed by summing the corresponding energies of the power spectrum.

$$E_{Y,cb}(l)=\sum_{k=bl_{cb}}^{bh_{cb}}|Y_k(l)|^2 \tag{12}$$

$$E_{N,cb}(l)=\sum_{k=bl_{cb}}^{bh_{cb}}P_k(l) \tag{13}$$

Where $E_{Y,cb}$ and $E_{N,cb}$ are the critical band energy for the echo and noise signal, respectively. $bl_{cb}$ and $bh_{cb}$ are the lower boundary and upper boundary of the critical band cb, respectively.

2. The critical band energies are convolved with a "spreading function" ($h_{cb}(l)$)) and the resulting masking threshold curves are given by $C_{Y,cb}(l)=h_{cb}(l)*E_{Y,cb}(l)$ and $C_{N,cb}(l)=h_{cb}(l)*E_{N,cb}(l)$, respectively.
3. As discussed in Johnston's paper referenced above, there are two noise masking thresholds, one is for tone masking noise and the other is for noise masking a tone. Different offsets need to be subtracted from the spread critical band spectrum derived above depending on the noise-like or tone-like nature of $Y_k(l)$. In order to determine $Y_k(l)$'s tonality, the Spectral Flatness Measure (SFM) is used as in Johnston's paper. For the threshold of the noise estimate $T_{N,cb}(l)$, the tonality estimation step may be skipped by assuming its ambient noise nature. For echo $Y_k(l)$ the offset $O_{cb}$ is obtained for critical band cb as:

$$O_{Y,cb}(l)=\alpha_{sfm}(14.5+cb)+(1+\alpha_{SFM})5.5$$

For noise a fixed offset value is used: $O_{N,cb}(l)=5.5$

4. The masking thresholds are renormalized by the inverse of the energy gain caused by the spreading function:

$$T_{Y,cb}(l)=10^{\log 10(C_{Y,cb}(l))-(O_{Y,cb}(l)/10)}$$

$$T_{N,cb}(l)=10^{\log 10(C_{N,cb}(l))-(O_{N,cb}(l)/10)}$$

$$T'_{Y,cb}(l)=T_{Y,cb}(l)E_{Y,cb}(l)/C_{Y,cb}(l)$$

$$T'_{N,cb}(l)=T_{N,cb}(l)E_{N,cb}(l)/C_{N,cb}(l)$$

5. The masking thresholds $T_{Y,cb}(l)$ and $T_{N,cb}(l)$ are mapped from the bark scale back to a linear frequency scale to obtain $T_{Y,k}(l)$ and $T_{N,k(l)}$.

From the masking thresholds, two gain values are derived as below:

$$G_{max,k}(l)=\max\left(1,\ \sqrt{\frac{P_k(l)}{T_{Y,k}(l)}}\right) \tag{14}$$

$$G_{min,k}(l)=\max\left(1,\ \sqrt{\frac{T_{N,k}(l)}{|Y_k(l)|^2}}\right) \tag{15}$$

$G_{max,k}(l)$ refers to the gain needed in frequency sub-band k at frame l to raise the audio masking threshold $T_{Y,k}(l)$ above the ambient noise level so that the noise will just be inaudible at that frequency and time due to the masking effect of the loudspeaker signal. This is regarded as the upper bound of gain to be applied to the loudspeaker signal, if any gain higher than this were applied the noise would be masked by the loudspeaker signal. $G_{min,k}(l)$ defines the lower bound of the gain, below which the loudspeaker signal would be masked by the noise. Examples of the results produced within the critical band domain by applying these maximum and minimum gains to the primary audio input signal are illustrated in FIG. 3.

Figure 3:
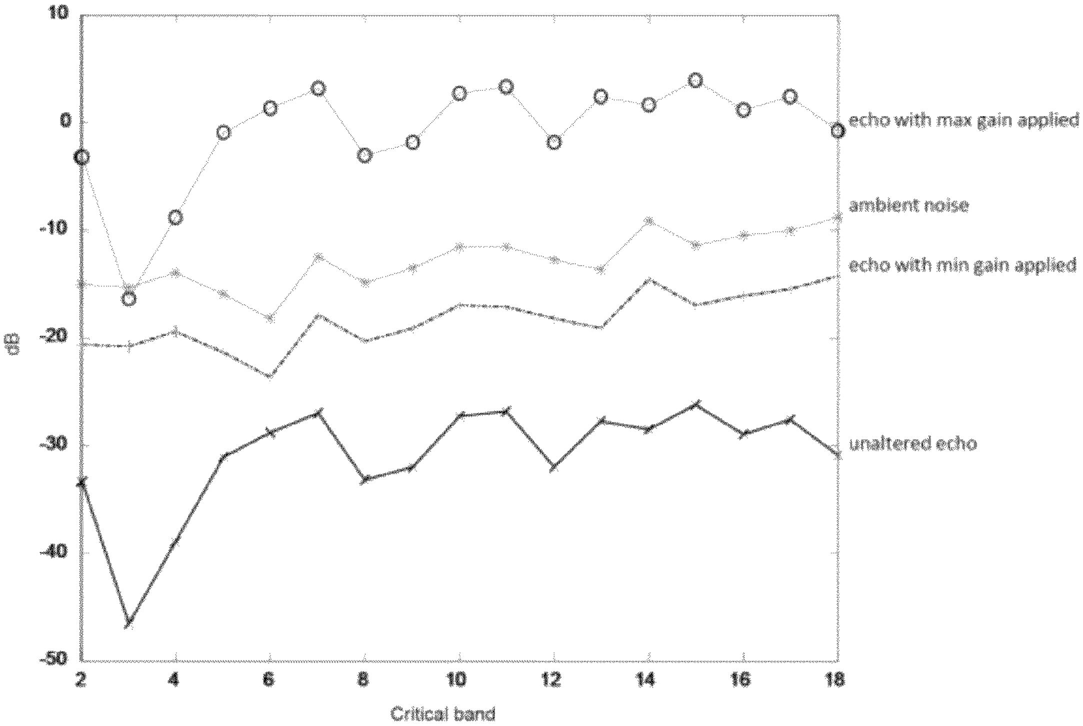
FIG. 3 shows the effect of applying minimum and maximum gain to the primary audio input signal.

In FIG. 3: the dotted line marked with circles (- - o - -) shows the echo signal spectrum produced by applying the maximum gain $G_{max,k}(l)$ to the primary audio input signal and playing this through the loudspeaker, the dashed line marked with asterisks (—— * ——) shows the ambient noise spectrum $E_{N,cb}(l)$, the dash-dot line marked with plusses (- — - + — - —) shows the echo signal spectrum produced by applying the minimum gain $G_{min,k}(l)$ to the primary audio input signal and playing this through the loudspeaker, and the solid line marked with xs (—x—) shows the unaltered echo signal spectrum $E_{Y,cb}(l)$. The x-axis uses the psychoacoustical Bark scale which is based on subjective measurements of loudness.

The final gain that will be applied to the loudspeaker signal is the weighted sum of $G_{max,k}(l)$ and $G_{min,k}(l)$:

$$G_k(l)=\alpha_{G,k}G_{max,k}(l)+(1-\alpha_{G,k})G_{min,k}(l) \tag{16}$$

where $0<\alpha_{G,k}<1$

The adjustable weighting parameter a provides the flexibility to the system for individual customization. For example the user could turn a volume dial to adjust a. Provided a is kept between zero and one the gain values are always estimated such that they fall between the upper and lower bounds, and both the noise and echo signals remain audible.

Figure 4A:
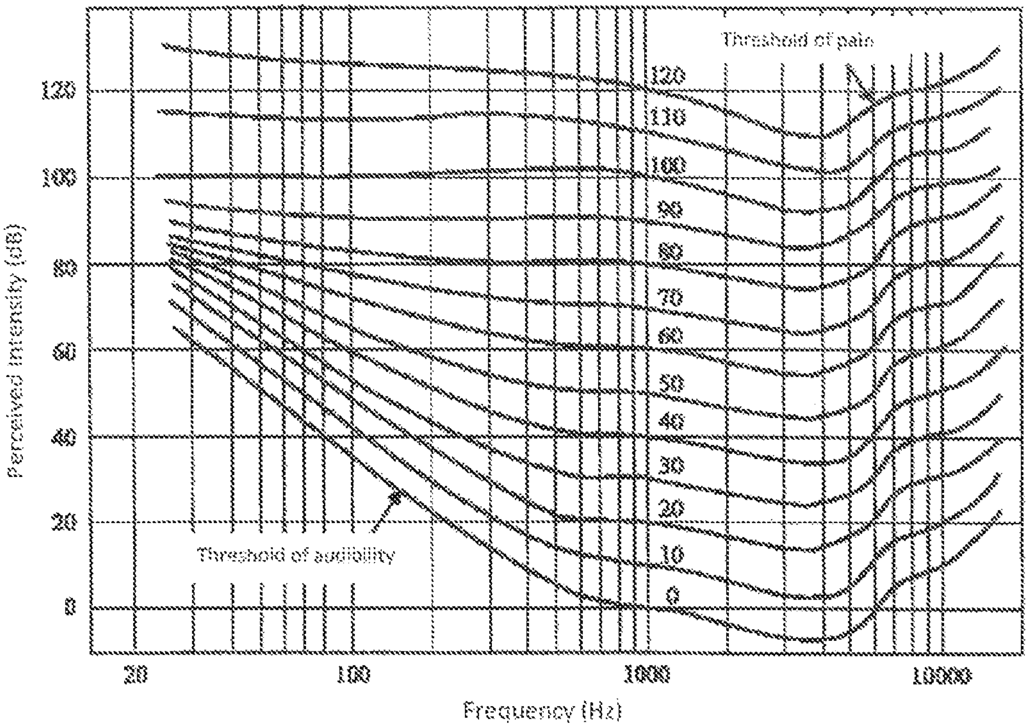
FIG. 4*a* shows equal loudness contours.

Finally tonal balance is considered. When there is a substantial amount of ambient noise, dynamic audibility enhancement can significantly change the overall sound level, and consequently alter the 'tonal balance'. The ear becomes relatively more sensitive to low frequencies at high intensities. Conversely, at low sound pressure levels human ears are less sensitive to the very low and very high frequencies. These effects are shown in the equal loudness contours depicted in FIG. 4*a*, taken from Moore, B. C. J. An Introduction to the Psychology of Hearing, Academic Press, 1997. Each contour plots the sound intensity perceived by the average human when they are played sounds over a range of frequencies with equal actual intensity (the actual intensity is marked on each contour). The lowest contour is at 0 dB, the threshold of human hearing, and the highest at 120 dB, the threshold of pain. Furthermore, dynamic audibility enhancement may only change the amplitude of certain frequency components depending on the noise spectrum, which can result in more 'tonal balance' alteration.

Figure 4B:
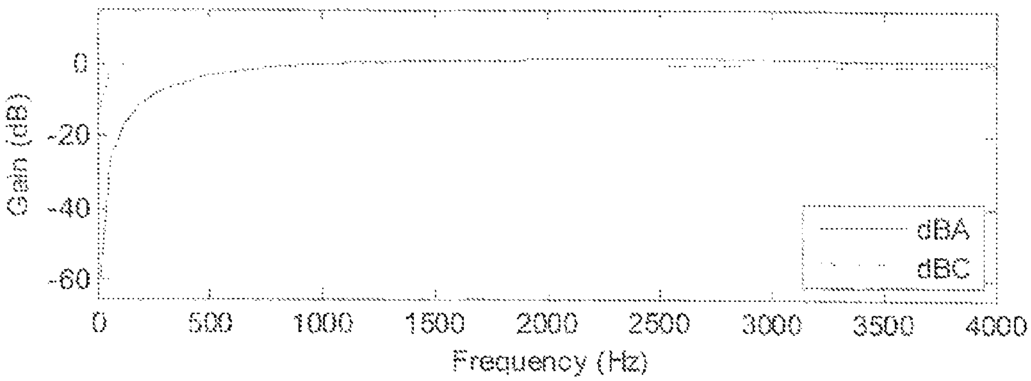
FIG. 4*b* shows the A-weighting (dBA) and C-weighting (dBC) curves.

To address the potential tonal balance issues caused by dynamic audibility enhancement, tonal balance compensation unit 11 is used. This utilises a correction measure using the A-weighting (dBA) and C-weighting (dBC) curves, which correspond to the measurement of perceived low and high sound pressure levels/respectively. These are shown in FIG. 4*b*, with the dBA curve being represented by the solid line, and the dBC curve being represented by the dashed line. In order to maintain tonal balance the gains applied to the primary audio input signal are reduced at very low and very high frequencies.

The weighting functions are:

$$R_A(f) = \frac{12200^2 \cdot f^4}{(f^2+20.6^2)\sqrt{(f^2+107.7^2)(f^2+737.9^2)}\,(f^2+12200^2)} \tag{17}$$

$$A(f) = 2.0 + 20\log_{10}(R_A(f)) \tag{18}$$

$$R_C(f) = \frac{12200^2 \cdot f^2}{(f^2+20.6^2)(f^2+12200^2)} \tag{19}$$

$$C(f) = 0.06 + 20\log_{10}(R_C(f)) \tag{20}$$

A tonal balance compensation factor TBC(f) is obtained by subtracting the C-weighting curve (C(f)) from the A-weighting curve (A(f)) and converting the difference to the linear domain:

$$TBC(f) = 10^{\frac{A(f)-C(f)}{20}} \tag{21}$$

Figure 4C:
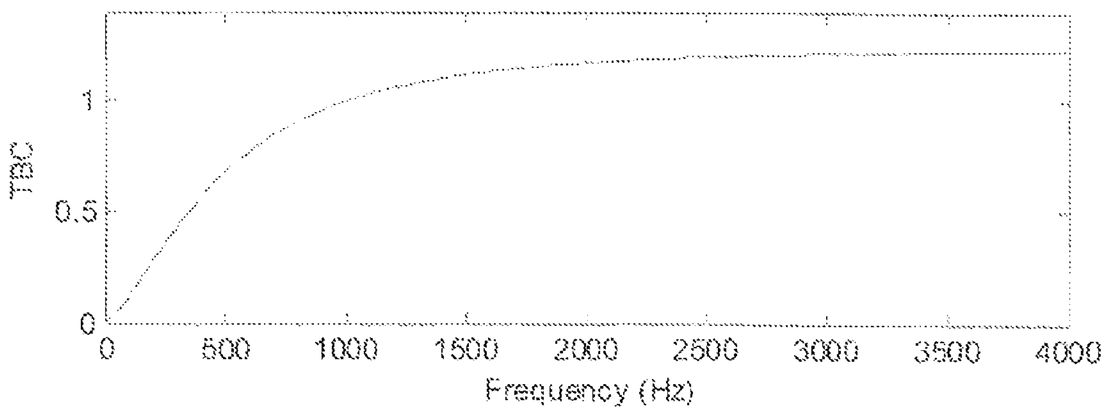
FIG. 4*c* shows a tonal balance compensation curve.

It can be seen from FIG. 4*b* that at low frequencies dBA is lower whereas it is higher than dBC for higher frequencies. FIG. 4*c* shows the tonal balance compensation factor TBC, which has smaller values for lower frequencies. This implies that in general less gain is applied to the low frequencies when the signal is amplified.

Finally, by multiplying the tonal balance compensation factor with equation 3, the equalized loudspeaker signal in frequency sub-band k for frame l is obtained as:

$$\hat{X}_k(l) = |X_k(l)|G_k(l)TBC_k \tag{22}$$

Figure 6:
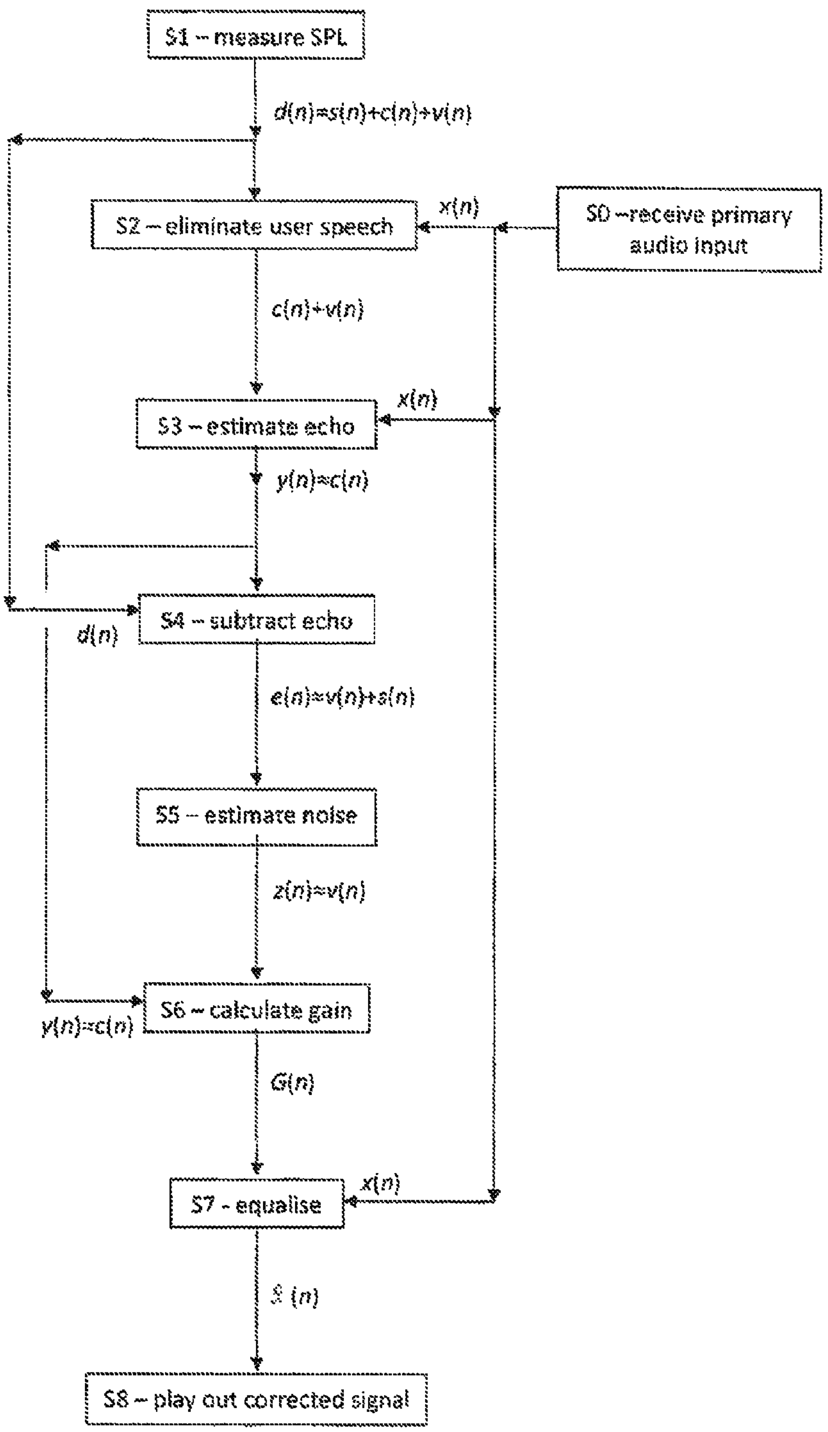
FIG. 6 shows a flowchart of the signal processing carried out in an example system.

The apparatus described above and in FIG. 5 carries out signal processing as depicted in the flow chart of FIG. 6. At step S0, the primary audio input signal x(n) is received. At step S1, microphone 4 picks up audio signal d(n), composed of echo c(n), ambient noise v(n), and user speech s(n). At step S2 this signal is processed by double talk detector 8 with primary audio input signal x(n) to exclude the user speech s(n), producing signal c(n)+v(n). At step S3, this signal is passed through adaptive filter 7 along with the reference primary audio input signal x(n) to produce echo signal estimate y(n). At step S4, the echo signal estimate y(n) is subtracted from microphone signal d(n) to produce error signal e(n). At step S5, error signal e(n) is used by noise estimation module 9 to produce noise estimate z(n). At step S6, this is passed to dynamic gain calculation unit 10 along with echo estimate y(n) to produce frequency dependent gain G(n). At step S7 G(n) and x(n) are processed by tonal balance compensation module 11 to produce equalised loudspeaker signal $\hat{x}$(n). Finally at step S8 this is played out by loudspeaker 6.

Various modifications could be made to the system, for example the adaptive filter could use a least mean square algorithm, recursive least square algorithm, or affine projection algorithm, amongst others.

The receive side voice activity detectors could be any event detector able to detect audio signals. Alternatively a soft-decision double talk detector (as taught in U.S. patent application Ser. No. 11/200,575, incorporated herein by reference) or a cross-correlation based approach (as in Jacob Benesty, Dennis R. Morgan, and Juan H. Cho, "A new class of doubletalk detectors based on crosscorrelation," IEEE Transactions on Speech and Audio Processing, vol. 8, pp. 168-172, March 2000) could be used.

The noise estimation module 9 can be used before the adaptive filter 7. That is, the input of 9 can be the initial microphone signal (d(n)) instead of the error signal e(n): In this case, 9 could be a noise cancellation module that removes noise components from the microphone signal. Having noise cancellation before the adaptive filter would improve the convergence of the filter. However noise cancellation algorithms often introduce non-linearity to the system which can have a negative impact on the linear adaptive filter. Such non-linearity can be partially compensated by applying the gain values of the noise canceller to x(n) before the adaptive filter 7 in FIG. 5 as shown in Guelou, Y.; Benamar, A.; Scalart, P.; "Analysis of two structures for combined acoustic echo cancellation and noise reduction," *Proc. Acoustics, Speech, and Signal Processing, IEEE International Conference on, vol.* 2, no., pp. 637-640 vol. 2, 7-10 May 1996.

The various steps of the proposed method may be carried out by individual modules, or the modules may be integrated with each other in any combination.

The system could be implemented in, amongst other things, a radio, hands-free kit, GPS system with text-to-speech capabilities or media player, for example for use in a vehicle such as a car, or in a mobile phone or personal media player. The loudspeaker may be intended to be heard by one user only, for example if it is located in a set of headphones, or may be a more powerful speaker intended to be heard by anyone nearby, for example in a car radio.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of enhancing an audio signal comprising the steps of:

a) receiving a primary audio input signal, b) receiving a detected audio signal which comprises:

A) an echo component derived from play-out of the primary audio input signal and B) a noise component, and c) estimating from the primary audio input signal and the detected audio signal:

1) a set of frequency-specific lower bound gains, such that each frequency-specific lower bound gain, when applied to a respective frequency of the primary audio input signal, would cause the noise component to just mask the echo component at that respective frequency and 2) a set of frequency-specific upper bound gains, such that each frequency-specific upper bound gain, when applied to a respective frequency of the primary audio input signal, would cause the echo component to just mask the noise component at that respective frequency;

d) estimating a set of frequency-specific gains in such a way that each frequency-specific gain falls between the respective frequency-specific lower bound gain and respective frequency-specific upper bound gain; and e) applying the frequency-specific gains to the primary audio input signal.

2. A method according to claim 1 wherein each frequency-specific gain is specific to a respective frequency sub-band.

3. A method according to claim 1, wherein the step of applying the frequency-specific gains to the primary audio input signal produces an output signal, the method comprising the further step of:

f) playing out the output signal.

4. A method according to claim 1 wherein step c) comprises the sub-steps of:

c-i) estimating the echo component, c-ii) estimating the noise component, c-iii) estimating a frequency-specific auditory masking threshold for the echo component, c-iv) estimating a frequency-specific auditory masking threshold for the noise component, and c-v) using the aforesaid frequency-specific auditory masking thresholds to calculate the upper and lower bounds.

5. A method according to claim 1 wherein the frequency-specific gains are each equal to the result of summing two terms;

the first term being equal to the result of multiplying a weighting factor, having a value between zero and one, with the respective frequency-specific upper bound, and the second term being equal to the result of multiplying one minus the weighting factor with the respective frequency-specific lower bound.

6. A method according to claim 1 wherein the frequency-specific gains are each equal to the result of summing two terms;

the first term being equal to the result of multiplying a weighting factor, having a value between zero and one, with the respective frequency-specific upper bound, and the second term being equal to the result of multiplying one minus the weighting factor with the respective frequency-specific lower bound, the method comprising the further step of the weighting factor being specified by a user.

7. A method according to claim 1 wherein step c) comprises the sub-step of:

c-i) estimating the echo component by means of an adaptive filter algorithm.

8. A method according to claim 1 wherein step c) comprises the sub-step of:

c-i) estimating the echo component by means of an adaptive filter algorithm, wherein the detected audio signal is monitored for the presence of user speech, and the adaptation of the filter is slowed down or halted when user speech is detected.

9. A method according to claim 1 wherein the execution of step e) produces an output signal, the method comprising the further step of:

f) playing out the output signal produced in step e), wherein step e) comprises the sub-steps of:

e-i) applying the frequency-specific gains to the primary audio input signal, this sub-step producing a gain-adjusted signal, and e-ii) modifying the gain-adjusted signal produced in sub-step e-i) such that the varying sensitivity to different frequencies at different sound pressure levels of the average human ear is compensated for.

10. A system for enhancing an audio signal comprising:

a primary audio input for receiving a primary audio input signal, a detected audio input for receiving a detected audio signal wherein the detected audio signal comprises:

A) an echo component derived from play-out of the primary audio input signal and B) a noise component, and an estimation unit for estimating from the primary audio input signal and the detected audio signal:

1) a set of frequency-specific lower bounds for gains, such that each frequency-specific lower bound gain value, when applied to a respective frequency of the primary audio input signal, would cause the noise component to just mask the echo component at that respective frequency and 2) a set of frequency-specific upper bounds for gains, such that each frequency-specific upper bound gain, when applied to a respective frequency of the primary audio input signal, would cause the echo component to just mask the noise component at that respective frequency;

3) a set of frequency-specific gains estimated in such a way that each frequency-specific gain falls between the respective frequency-specific lower bound and respective frequency-specific upper bound; and a processing unit for applying the frequency-specific gains to the primary audio input signal.

11. A system according to claim 10 wherein the frequency-specific gains are specific to frequency sub-bands.

12. A system according to claim 10 further comprising:

a loudspeaker for playing out the signal produced by the processing unit.

13. A system according to claim 10 wherein the estimation unit comprises:

an echo estimation module for estimating the echo component, a noise estimation module for estimating the noise component, a module for estimating a frequency-specific auditory masking threshold for the echo component, a module for estimating a frequency-specific auditory masking threshold for the noise component, and a module for using the aforesaid frequency-specific auditory masking thresholds to estimate the frequency-specific upper and lower bounds.

14. A system according to claim 10 wherein the frequency-specific gains are equal to the result of summing two terms;

the first term being equal to the result of multiplying a weighting factor, having a value between zero and one, with the respective frequency-specific upper bound, and the second term being equal to the result of multiplying one minus the weighting factor with the respective frequency-specific lower bound.

15. A system according to claim 10 wherein the frequency-specific gains are equal to the result of summing two terms;

the first term being equal to the result of multiplying a weighting factor, having a value between zero and one, with the respective frequency-specific upper bound, and the second term being equal to the result of multiplying one minus the weighting factor with the respective frequency-specific lower bound, the system further comprising a control for adjusting the weighting factor, actuable by the user.

16. A system according to claim 10 wherein the estimation unit comprises:

an echo estimation unit which estimates the echo component using an adaptive filter.

17. A system according to claim 10 wherein the estimation unit comprises:

an echo estimation unit configured to estimate the echo component using an adaptive filter, the system further comprising:

a double talk detector configured to monitor the detected audio input signal for the presence of user speech, and slow down or halt the adaptation of the filter when user speech is detected.

18. A system according to claim 10 further comprising:

a processing unit for applying the frequency-specific gains to the primary audio input signal, and a tonal balance compensation module for modifying the signal produced by the processing unit such that the varying sensitivity to different frequencies at different sound pressure levels of the average human ear is compensated for.

19. A system according to claim 10 wherein the estimation unit comprises:

an echo estimation module which estimates echo using an adaptive filter, wherein the adaptive filter is a normalized least mean squares filter.

20. A system according to claim 10 further comprising:

a noise estimation module, wherein the noise estimation module is a recursive noise estimator configured to be adaptively controlled by the output of a module which is configured to estimate the probability of the absence of speech in the detected audio signal.

* * * * *

UNITED STATES PATENT AND TRADEMARK OFFICE

CERTIFICATE OF CORRECTION

PATENT NO. : 8,509,450 B2
APPLICATION NO. : 12/861361
DATED : August 13, 2013
INVENTOR(S) : Xuejing Sun It is certified that error appears in the above-identified patent and that said Letters Patent is hereby corrected as shown below:

In the Specification

Column 1, Line 65, delete “users” and insert -- user’s --, therefor.

Column 7, Line 28, delete “Y*(l),” and insert -- $Y_k(l)$, --, therefor.

Column 9, Line 24, delete “Y)” and insert -- $Y_k(l)$ --, therefor.

Column 9, Line 45, delete “$(h_{cb}(l)))$” and insert -- $(h_{cb}(l))$ --, therefor.

Column 9, Line 60, delete “ $O_{Y,cb}(l)=\alpha_{sfm}(14.5+cb)+(1+\alpha_{SFM})5.5$ ” and insert -- $O_{Y,cb}(l) = \alpha_{SFM}(14.5 + cb) + (1 - \alpha_{SFM})5.5$ --, therefor.

Signed and Sealed this
Twenty-seventh Day of May, 2014

Michelle K. Lee
*Deputy Director of the United States Patent and Trademark Office*